Patented May 17, 1949

2,470,393

UNITED STATES PATENT OFFICE

2,470,393

UREA FORMALDEHYDE TYPE OF MOLDING COMPOUNDS AND METHOD OF PRODUCING SAME

Eustace Glycofrides, Toledo, Ohio, assignor to Owens-Illinois Glass Company, a corporation of Ohio No Drawing. Application September 2, 1944, Serial No. 552,578

2 Claims. (Cl. 260—17.3)

My invention relates to organic molding compounds of the thermosetting type which set or harden under heat and pressure while within the mold.

The invention provides a compound in which lignocellulose is reacted with urea and formaldehyde in a manner to produce a molding material which when reduced to suitable particle size, is adapted to be molded into various articles under heat and pressure.

Heretofore molding compounds have been proposed in which a urea-formaldehyde resin is combined or reacted with various fillers such as wood flour, etc. The ordinary commercial urea-formaldehyde molding powder comprises about 55% urea-formaldehyde resin, the remaining 45% consisting mainly of a filler such as wood flour. This large percentage of the resin has been found necessary in order to make a powder suitable for commercial use.

An object of the present invention is to provide a molding compound of the type indicated and a method of making the same in which a comparatively large percentage of lignocellulose is used with a corresponding reduction in the amount of urea and formaldehyde, thereby reducing the cost of the molding compound.

In making molding powders of the urea-formaldehyde resin type, the most expensive item is the resin itself, the wood flour or other filler being a comparatively inexpensive ingredient. I have discovered that by mixing a lignocellulose such as herein set forth, with the urea and formaldehyde, the latter in solution, before the urea-formaldehyde is condensed, and reacting all the ingredients in the manner hereinafter set forth, the urea-formaldehyde content can be reduced to about 20% to 30% as compared with about double that amount as found in commercial powders of this type. Such reduction is made without impairment of the resulting compound.

In accordance with the present invention, the urea and formaldehyde which are co-reacted in combination with the lignocellulose, may be in the proportions of 1 molecule of urea and 1.2 molecules of formaldehyde, or 200 g. of formaldehyde and 100 g. urea. A commercial formaldehyde solution may be employed comprising a 40% by volume solution or 37% by weight. I have found that the urea and formaldehyde may be in the proportion of 1 molecule of urea and anywhere from 1 to 2 molecules of formaldehyde and, when in such proportions, can be used very effectively in producing molding compounds by the method herein described.

The lignocellulose employed by the present invention, as made commercially, contains about 30% to 40% of lignin and 60% to 70% of cellulose. For increasing lignin in wood pulps, the pulp is subjected to a hydrolytic reaction aided by the use of a catalyst such as sulphuric acid, an organic acid, or an alkali, either organic or inorganic, and the reaction is carried on until the desired amount of lignin is produced.

In making a molding compound in accordance with my invention, a dye or coloring material may be added to the other ingredients. If an organic dye is used it may comprise about 1% of the mixture and if inorganic, about 2%. Any suitable dye or coloring material may be used, as for example, carbon black. Also a lubricant, for example, zinc stearate is preferably added in the proportion of ½ to 1%. In some instances it might be desirable to use in addition to the above ingredients, an accelerator of an acid nature. A desirable feature, however, which characterizes the present invention is that the polymerization ordinarily takes place without requiring the use of retarders or accelerating agents since it appears that the lignocellulose performs these functions.

Lignocellulose differs from ordinary commercial wood pulp and the like, mainly in the comparatively large percentage of lignin. I have found that it can be reacted together with the urea and formaldehyde in the manner hereinafter set forth, much more effectively than wood pulp, paper pulp, and similar cellulosic materials, and with superior results.

The properties of lignocellulose vary with the kind of wood or other material from which it is made. I have found that lignocellulose made from spruce is well adapted for the purpose of the present invention and superior to that produced from some other kinds of wood. A lignocellulose made primarily from spruce and known in the trade as "Marathon" lignocellulose is produced by the Marathon Paper Company and is well adapted for use in making molding compounds in accordance with my invention.

In practicing the invention the following ingredients may be mixed and reacted together, viz., urea, formaldehyde in solution, lignocellulose, and if desired a coloring material and/or a plasticizer. The ingredients may be reacted in a masticator, the mixture then dried in an oven, and thereafter milled. The material which comes from the milling rolls in sheet form is ground to the desired particle size. Molding compounds thus produced are adapted to be molded under heat and pressure.

Examples of molding compounds made in accordance with my invention, and the method of producing them, are as follows:

Example 1

Urea, 152 g.
Commercial formaldehyde 40% by volume solution, 304 g. } 44% yield=200 g., or 20%
10 cc. of 10% sodium hydroxide as a catalyst.
Lignocellulose, 780 g., 78%
Carbon black, 20 g., 2%
Zinc stearate, 20 g.

The above ingredients are mixed and reacted together in a masticator at a temperature not to exceed 80° C. for one hour. The reacted mixture is then dried in an oven at 60° C. until the moisture content is reduced to about 5%. The mixture is milled in rolls for about 2 to 10 minutes, the length of time depending on the flow required for its use. The temperature of the rolls is about 250° to 300° F. (or 120° C. to 150° C.). The material rolled in the mill comes out in sheet form, and this sheet is ground to the required particle size, which may vary according to the particular purpose for which it is to be used. The molding compound thus produced, when molded under heat and pressure, is found to have excellent flowability, plasticity, and all the desirable characteristics of a thermosetting molding powder.

Example 2

Urea, 190 g.
Commercial formaldehyde 40% by volume solution, 380 g. } 44% yield=250 g., or 25%
10 cc. of 10% sodium hydroxide.
Lignocellulose, 730 g., 73%
Bone black, 20 g., 2%
Zinc stearate, 20 g.

Other colors can replace the bone black as desired. The procedure in Example 2 is the same as in Example 1.

Example 3

Urea, 227 g.
Commercial formaldehyde 40% by volume solution, 454 g. } 44% yield=300 g., or 30%
16 cc. of 10% sodium hydroxide as a catalyst.
Lignocellulose, 680 g., 68%
Bone black, 20 g., 2%
Zinc stearate, 20 g.

The procedure in Example 3 is the same as in Example 1.

Example 4

Urea, 378 g.
Commercial formaldehyde 40% by volume solution, 756 g. } 44% yield=500 g., or 50%
22 cc. of 10% sodium hydroxide as a catalyst.
Lignocellulose, 480 g., 48%
Bone black, 20 g., 2%
Zinc stearate, 20 g.

The procedure in Example 4 is the same as in Example 1.

The percentages herein given are by weight except as otherwise specified.

Modifications may be resorted to within the spirit and scope of my invention.

I claim:

1. The method of producing a molding compound which comprises reacting together at a temperature not to exceed 80° C. for substantially one hour a wet mixture comprising the following ingredients in substantially the following proportions, namely, urea, 190 grams, a 40 per cent by volume solution of commercial formaldehyde, 380 grams, 10 cc. of 10 per cent sodium hydroxide, lignocellulose, 730 grams, coloring matter, 20 grams, zinc stearate, 20 grams; oven drying the reacting mixture at about 60° C. until the moisture content is reduced to about 5 per cent, milling the resultant product in rolls for from about 2 to 10 minutes with the rolls at a temperature of about 120° C. to 150° C., and grinding the rolled material to particle size.

2. The reaction product of the method defined in claim 1.

EUSTACE GLYCOFRIDES.

REFERENCES CITED

The following references are of record in the file of this patent:

UNITED STATES PATENTS

| Number | Name | Date |
|---|---|---|
| 2,033,411 | Carson | Mar. 10, 1936 |
| 2,068,926 | Nevin | Jan. 26, 1937 |
| 2,126,677 | Ellis | Aug. 9, 1938 |
| 2,192,129 | Ellis | Feb. 27, 1940 |
| 2,197,724 | Hovey | Apr. 16, 1940 |
| 2,208,290 | Glycofrides | July 16, 1940 |
| 2,313,953 | Loughborough | Mar. 16, 1943 |
| 2,346,708 | Smidth | Apr. 18, 1944 |

FOREIGN PATENTS

| Number | Country | Date |
|---|---|---|
| 697,312 | France | Oct. 27, 1930 |